United States Patent [19]

Grimes

[11] Patent Number: 4,458,314
[45] Date of Patent: Jul. 3, 1984

[54] CIRCUITRY FOR ALLOCATING ACCESS TO A DEMAND SHARED BUS

[75] Inventor: Gary J. Grimes, Thornton, Colo.

[73] Assignee: Bell Telephone Laboratories, Incorporated, Murray Hill, N.J.

[21] Appl. No.: 337,868

[22] Filed: Jan. 7, 1982

[51] Int. Cl.³ .............................................. G06F 7/02
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,796,992 | 3/1974 | Nakumura et al. | |
| 3,818,447 | 6/1974 | Craft. | |
| 3,983,540 | 9/1976 | Keller et al. | |
| 4,096,571 | 6/1978 | VanderMey | 364/200 |
| 4,334,288 | 6/1982 | Booher | 364/900 |
| 4,385,350 | 5/1983 | Hansen et al. | 364/200 |

Primary Examiner—Thomas M. Heckler
Attorney, Agent, or Firm—Donald M. Duft

[57] ABSTRACT

Circuitry is disclosed for allocating requests for demand-sharing bus access among a plurality of service requesting ports. During bus contention time, each requesting port synchronously and sequentially applies the digits of its assigned unique priority code to the bus beginning with the most significant digit. After the application of all digits, only the requesting port having the highest code remains in contention and it seizes the bus. The present invention provides flexibility in port preference by the use of a plurality of status flip-flops in each port for generating dynamic port parameter bits. The generated parameter bits are normally applied to the bus as the most significant bits of a dynamic port priority code during contention time. The state of the status flip-flops is controlled by circuitry which counts the number of packets of a specified size currently stored in the buffer memory of each port. This gives preference to the port whose memory contains the largest number of packets of the specified size. For a PBX, this permits short packets containing time sensitive system control messages to be given preference over longer packets containing relatively non-sensitive customer provided business information such as word processing files.

18 Claims, 7 Drawing Figures

CIRCUITRY FOR ALLOCATING ACCESS TO A DEMAND SHARED BUS

CROSS-REFERENCE TO RELATED APPLICATIONS

This application is related to the following concurrently filed applications:

J. O. Dimmick, Ser. No. 337,673, entitled "Circuitry for Allocating Access to a Demand-Shared Bus";

G. J. Grimes 2, Ser. No. 337,672, entitled "Circuitry for Allocating Access to a Demand-Shared Bus";

and G. J. Grimes 3, Ser. No. 337,674, entitled "Circuitry for Allocating Access to a Demand-Shared Bus".

TECHNICAL FIELD

This invention relates to a shared resource system and, more particularly, to apparatus for assigning access to the resource equitably among a plurality of requesting devices. More particularly, the invention relates to a packet switching system having an allocation facility for controlling access to a common bus by a plurality of requesting devices such as ports.

BACKGROUND OF THE INVENTION

Systems in which many devices share a common resource typically utilize arrangements for allocating access to the resource under conditions during which a plurality of associated devices may concurrently request access. Many different allocation arrangements are known in the art. In data processing and packet switching systems, it is known to use a centralized allocator or controller for allocating access to a common data bus interconnecting a plurality of units, such as ports, that may concurrently request access to the bus. The controller may be programmed with an appropriate algorithm to allocate bus access in accordance with any priorly determined criterion that may be desired. Although centralized controller allocation arrangements operate suitably to perform their intended function, they are not always desirable because of the inherent system complexity resulting from the many interconnections required between the controller, the bus, and the ports. Also, a reliability problem exists since a malfunction of the controller may remove the whole system from operation. A system having a centralized controller is shown by U.S. Pat. No. 3,983,540 issued Sept. 28, 1976 to Keller et al.

It is known to use distributed bus allocation arrangements in which a controller is not used to determine access and instead, the interaction of the requesting ports determines bus allocation in the event of simultaneous requests. Such distributed arrangements are often preferable since the expense of and the reliability problems associated with the centralized controller arrangement are avoided.

In accordance with one such distributed allocation arrangement, each port that may request access to a common bus is assigned a fixed priority number comprising a plurality of binary digits. Access is granted by priority number in case of concurrent requests. During bus contention time, when two or more ports concurrently request access, each requesting port applies the corresponding bits of its priority number to an arbitration bus sequentially, bit by bit, in synchronism with the application of corresponding bits by all other concurrently requesting ports. As each bit is applied, each bidding port compares the magnitude of the bit it is currently applying with the logical union of the corresponding bits applied simultaneously to the arbitration bus by all concurrently requesting ports. If a bit one requesting port currently applies has a prescribed relationship (such as equal to or higher) to the bits applied to the bus by the other requesting ports, this operation proceeds and the port applies the next bit of its assigned priority number to the arbitration bus.

Each port stays in contention as long as each bit it applies has the prescribed relationship to the logical union of the corresponding bits currently applied by other contending ports. A port removes itself from contention when it determines that a bit it applies has a relationship (such as is lower than) to the bits currently applied by the other ports indicating that one or more of the other ports has a higher priority number. At that time, each port having a lower priority number removes itself from contention and applies no further bits to the bus.

This contention operation continues; the remaining bits of the port priority numbers are applied to the bus by all remaining requesting ports; ports of a lower priority remove themselves from contention; and at the end of the contention interval when the last bit is applied to the bus, only the port having the highest priority remains in contention and it is granted access to the bus. An arrangement of the above described type is shown in U.S. Pat. No. 3,796,992 issued Mar. 12, 1974, to Nakamura et al and in U.S. Pat. No. 3,818,447 issued June 18, 1974 to Craft.

The above described distributed contention arrangement operates satisfactory. However, it suffers from the disadvantage that the port priority numbers are fixed and, since port access is determined by these numbers, the ports may be considered to be functionally arranged in a fixed preference chain with the most preferred port having the highest priority number and the least preferred port having the lowest priority number. This being the case, access to the bus is not equitable since ports having the higher priority numbers are always favored in the event of simultaneous requests. While this unequitable allocation of ports may be tolerable in certain systems, it is a disadvantage in those systems in which more equitable access by all ports is required.

SUMMARY OF THE INVENTION

My invention is directed to a solution of the foregoing problems and limitations of the prior art. I provide an improved method and structure for allocating a demand-shared bus among one or more requesting units or ports each of which has a unique assigned priority number comprising a plurality of binary coded digits. Further, and in accordance with my invention, each port includes facilities for monitoring dynamically the current state of various operational port parameters and for generating corresponding port priority bits representing these parameters. These generated bits are used in conjunction with the assigned port priority number bits to determine bus access.

The port parameter bits generated by the facilities of my invention are entered into the more significant bit positions of a port shift register. The assigned port priority numbered bits are entered into the remainder of the shift register so as to be of lesser significance than the parameter bits. During bus contention times, the bits in the shift register of each requesting port are read out sequentially one at a time beginning with the most significant bit and applied to the arbitration bus.

During conditions in which no port parameter bits are generated by the facilities of my invention, the shift register contains 0 in the corresponding more significant bit positions and contains the regularly assigned port priority number bits in its lesser significant bit positions. Under such conditions, port priority is determined using only the assigned port priority number. However, during operational states of ports in which a 1 is generated for one or more of the parameter bits, these parameter bits are read out of the shift register ahead of the port priority number bits and thus will, by themselves, control bus access. If two or more ports have identical parameter bits set to a one, and there are no other ports having parameter bits indicating a higher priority, the port priority number bits are then used to break the tie.

Facilities in accordance with my invention are provided which monitor the data packets currently in each port's packet buffer and identify the number of such packets that are of predetermined length, such as short packets. Short packets typically represent information that is more urgent time wise to system operation than the information in longer packets. For example, short packets typically contain path establishment or system control information; longer packets typically contain word processing or text information. It is often desirable that ports containing short packets be served, all other things being equal, ahead of ports containing long packets. Thus, the facilities of my invention identify and count the number of short packets entered into and read out of each port's packet buffer. These facilities cooperatively control an up/down threshold counter whose current state represents the number of short packets currently in the buffer. This counter drives circuitry which generates port parameter bits specifying that the port buffer contains (1) less tha "m" short packets, or (2) at least "m" short packet or (3) at least "n" short packets where n>m. Typical values for "m" and "n" are 2 and 5, respectively. These bits are extended to control circuitry which enters them into the port parameter portions of the shift register.

Further in accordance with my invention, I provide facilities in each port for counting the length of time the port waits for bus access after the port has assumed a certain operational state, such as one of the short packet identifier bits have been set to a 1. This facility includes a threshold counter which is advanced periodically by the system clock as the port waits for access. After the counter has advanced to a predetermined level, it generates a bit which is entered into the parameter portion of the shift register as an indication that the port has waited a predetermined time for port access after a packet length identifier bit is generated.

As before, the corresponding shift register bits of each requesting port are applied concurrently to a bus during contention time sequentially, bit by bit. This includes the port parameter bits as well as the assigned port priority number bits. The bit values of each contending port are compared in a prescribed order to the corresponding bus digit value. A unit is removed from bus contention if, on any digit comparison, a prescribed result is obtained indicating that another port of higher priority is requesting access. In the disclosed embodiment of the invention, the priority for bus access is based on the magnitude of the number defined by parameter bits and the assigned priority number bits in each port's shift register. In the disclosed embodiment, a wired OR TTL bus is used in which a 1 represents the dominant low voltage state.

In a packet switch, packets are stored in a buffer memory in the ports; the port contention logic completes for access to the common resources of the switch including typically a common packet transfer bus herein termed a data bus. A packet will be lost if it is transmitted to a port which already has one or more packets in its buffer memory and does not have enough room to store another packet. The rate of packet loss can be made small by providing enough memory in each port so that on a statistical basis the packet loss rate will be acceptable at the traffic limit of the switch. My invention makes it possible to design the packet switch so that smaller memories are required to give the same packet loss rate at a given amount of network traffic; or that with a fixed amount of memory, the packet loss rate will be smaller for a given amount of traffic. Since most of the cost and complexity of the switch is typically contained in the memory or queue of the ports, the port contention logic can be expanded considerably and still reduce the cost and complexity of the system since the capabilities of my invention make possible significant cost and complexity reductions in the memory. This invention provides means for making the switch's arbitration algorithm sensitive to the dynamic state of the ports as well as means for altering the parameters to which the algorithm is sensitive to on a frame-by-frame basis. This is accomplished by fault tolerant means without sacrificing the distributed nature of the arbitration means.

The above described arrangement overcomes the disadvantage of the prior art in that it provides increased flexibility and a more optimal allocation of ports for access to a facility or bus in systems in which each port is assigned a fixed priority number whose magnitude would otherwise determine the bus access priority.

BRIEF DESCRIPTION OF THE DRAWINGS

The foregoing and other advantages of my invention will be apparent from the following detailed description of an exemplary embodiment thereof, when read in conjunction with the accompanying drawing, in which.

DETAILED DESCRIPTION

Figure 1:
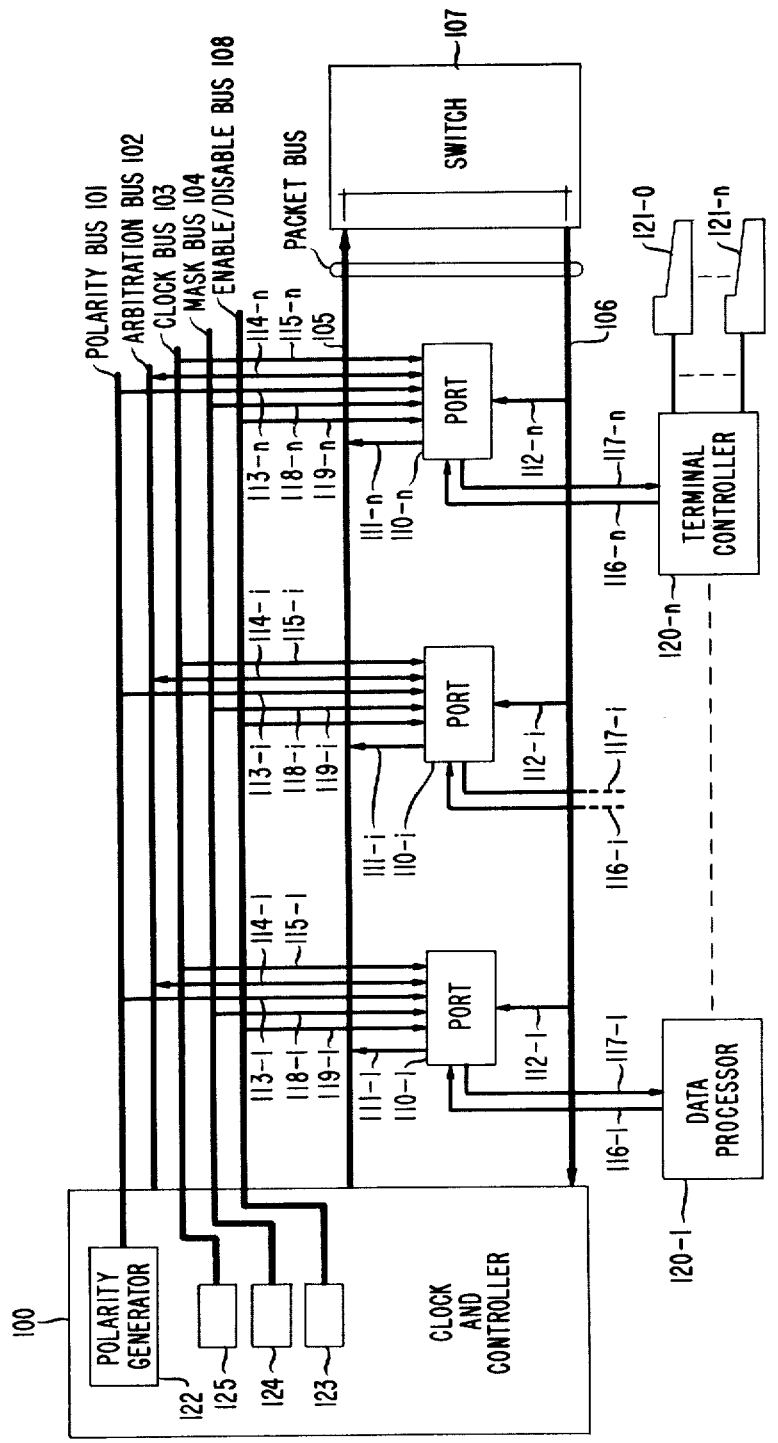
FIG. 1 is a simplified block diagram illustrating the components of a typical system in which my invention may be utilized.

FIG. 1 discloses a packet switching system embodying the present invention. On FIG. 1 is disclosed a controller 100, having a polarity generator 122, ports 110-1 through 110-n, switch 107, and a plurality of busses interconnecting the controller 100 with the ports 110. These busses include packet bus 105 and 106 which receive the data applied from the output data 111 of each port directed to another port. Packet bus 106 receives this data after it has been extended through switch 107 and applies it to the input 112 of each port. Clock bus 103 extends the signals shown on FIG. 3 from the controller to the ports. Arbitration bus 102 concurrently receives the corresponding priority bits applied sequentially by each requesting port during bus contention time. Polarity conductor 101 applies a potential from controller 100 to the ports 110 at selected times to cause them to apply to bus 102 the inverse of any digit of their assigned priority number.

The enable/disable bus 108 includes a conductor unique to each port and extends from the controller 100 to each port 110. This bus is effective when activated to cause the associated port to be removed from service and to deny it access to the arbitration bus 102 and the packet buses 105 and 106. The mask bus 104 comprises a conductor common to all ports and extends from the controller 100 to the ports. If is effective when activated to cause any combination of the port parameter bits to be disregarded during contention time so that bus access is awarded on the basis of the remaining parameter bits, if any, and the priority number assigned to each port.

Data processor 120-1 and terminal controller 120-n, together with terminals 121, are illustrative of the type of facilities that may be served by the ports. As is typical in packet switching, a transmitting port that obtains access to the packet bus 105 transmits whatever data may be desired over packet bus 105, thru switch 107, and over packet bus 106 to the input 112 of the port to which the information is directed FIG. 2 discloses further details of the ports 110 of FIG. 1. Each port includes an I/O interface 200, an input bus interface 210 and an output bus interface 220. The input bus interface 210 includes arbitration logic 218 and buffer 213 which applies data to the packet bus 105. Interface 210 further includes a FIFO 211, packet length detector 205 and a FIFO controller 214. The FIFO 210 receives packet information from interface 200 and temporarily stores it until it is read out and extended through the buffer to packet bus 105. The packet length detector includes counters and the like for monitoring the length of each packet received by and read out of FIFO 211. Detector 205 monitors the number of packets smaller than or larger than a predetermined length currently in the FIFO and by means of conductors 208 and 209 provides this information to arbitration logic 218 which, in turn, uses this information as port parameter bits. The FIFO controller 214 receives information over path 212 from the FIFO with this information including packet length information as well as bits specifying whether the FIFO is currently at least half-full or full. The controller passes this information over paths 206 and 207 to the arbitration logic 218 which uses this information as additional parameter bits for contention purposes.

Output bus interface 220 contains the circuitry by which the port receives information from packet bus 106. This circuitry includes buffer 221, FIFO 227, FIFO controller 225, and packet recognizer 223.

Figure 2:
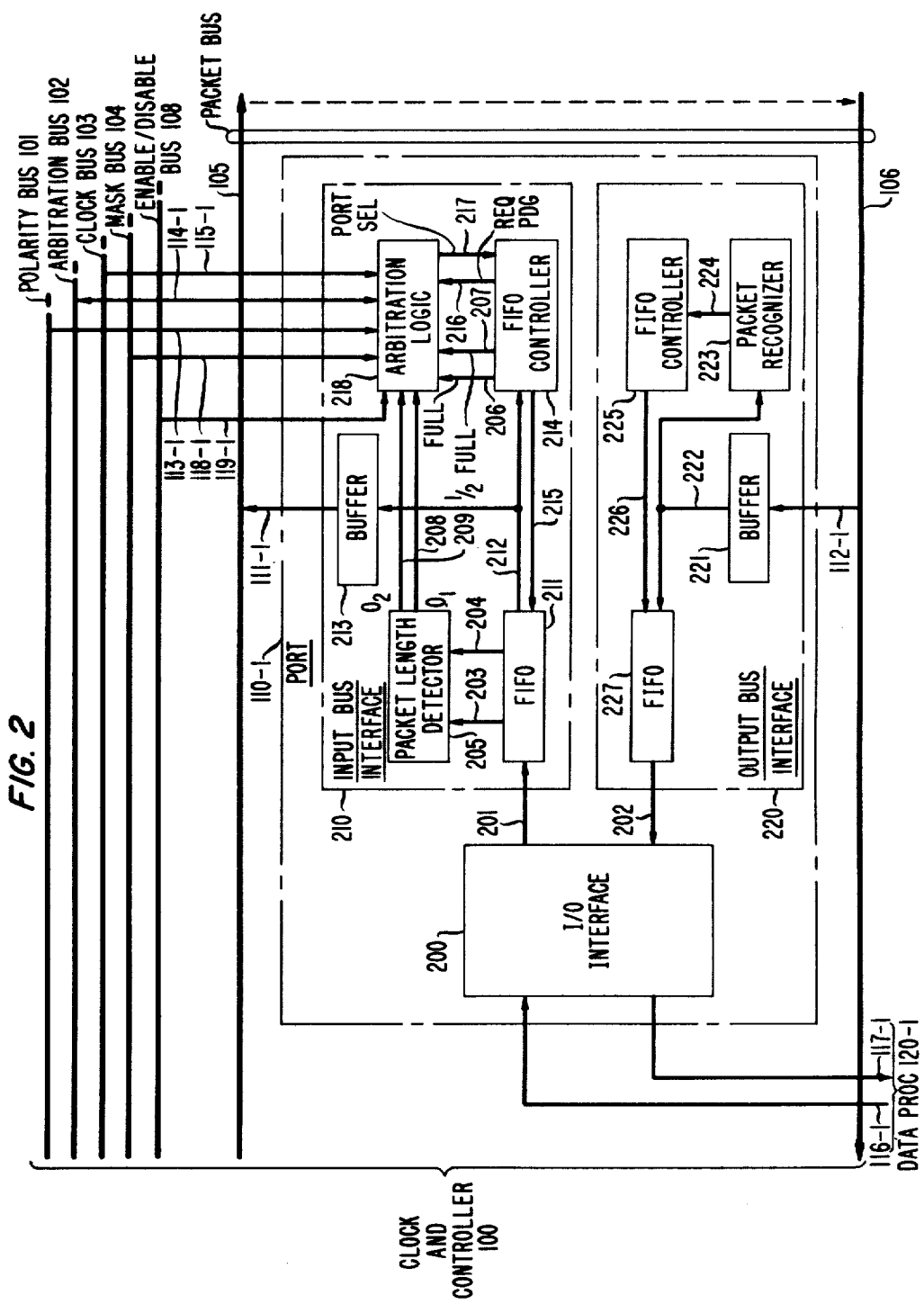
FIG. 2 discloses further details of the port circuit of FIG. 1.

Typically, the data processor 120 served by the port of FIG. 2 applies a packet of information to be sent to another port over path 116-1, thru I/O interface 200 and over path 201 to FIFO 211. The FIFO controller 214 detects the receipt of a complete packet by FIFO 211, transmits a request for bus access to arbitration logic 218 which then functions during the next contention interval to attempt to obtain access for the port to bus 105. Upon obtaining such access, FIFO controller 214 causes FIFO 211 to apply the packet information it contains via buffer 213 to packet bus 105. This information includes header information identifying the port to which the packet is being sent. After passing through the switch 107 on FIG. 1, the information is applied over packet bus 106, to path 112 of the receiving port, and via its buffer 221 to its FIFO 227 and its packet recognizer 223. Element 223 detects that the information now in FIFO 227 is indeed directed to this port and then, by means of FIFO controller 225, causes FIFO 227 to output the information via path 202, I/O interface 200, and over path 117 to the device served by the receiving port.

Figure 3:
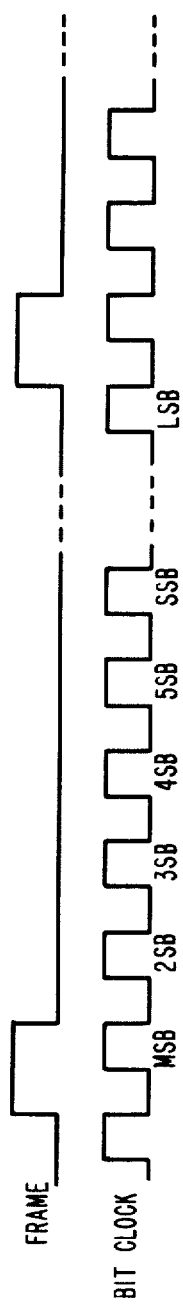
FIG. 3 is a timing diagram.

FIG. 3 discloses the waveforms of the timing and control signals applied over clock bus 103 to the ports. The top signal is a positive frame pulse and identifies the beginning of each frame. A bus contention interval begins with each frame pulse. This frame is as long as required for an entire packet to be transmitted. The bus contention logic and the packet transmission can occur simultaneously during each frame, with the port which wins a contention cycle controlling the packet bus 105 during the next frame. The lower signal is the bit clock signal and it is used for a number of control purposes during the contention or arbitration interval.

Figure 7:
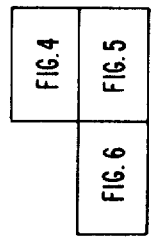
FIG. 7 discloses how FIGS. 4, 5, and 6 should be arranged with respect to each other.
Figure 4:
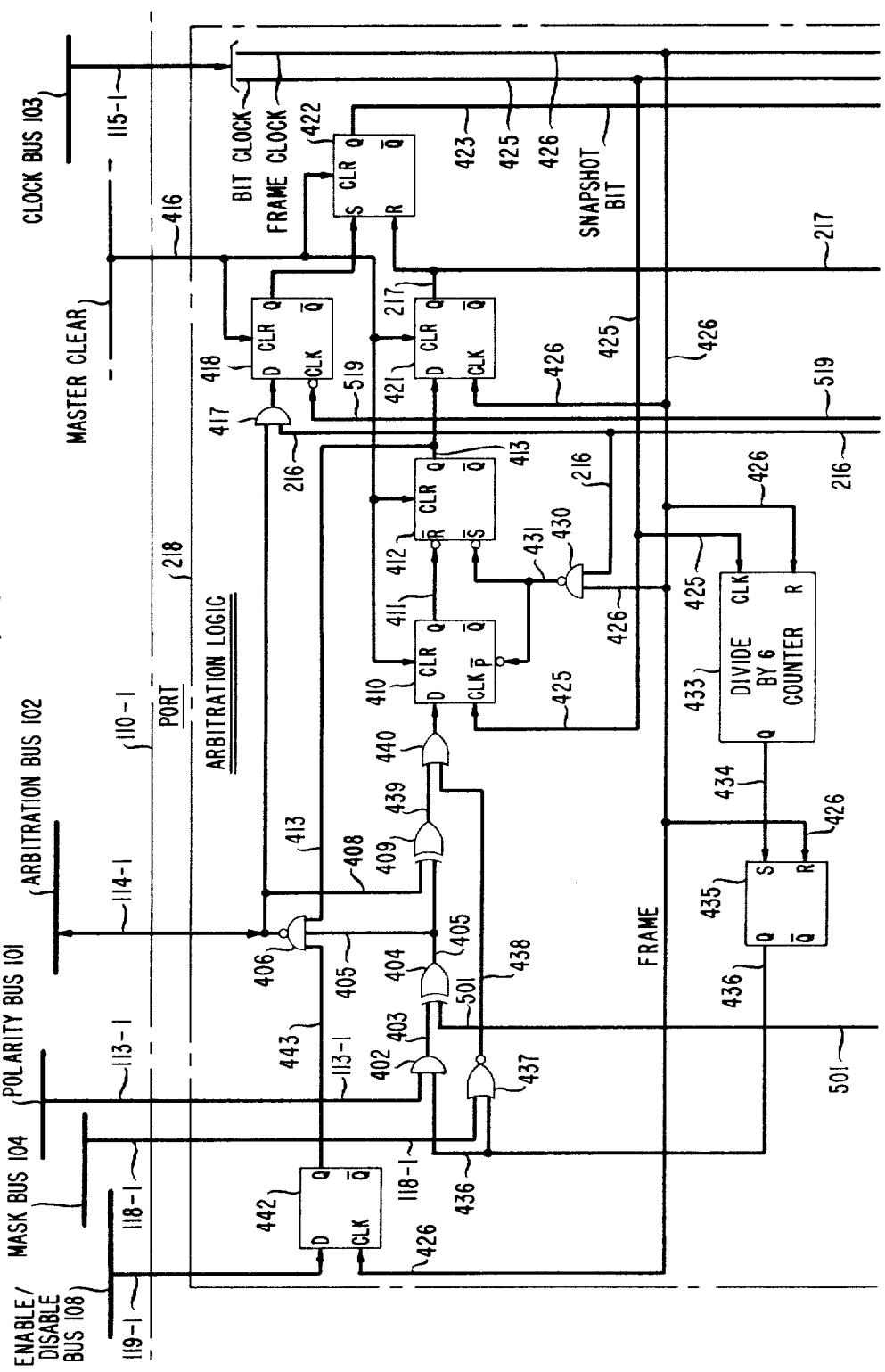
FIGS. 4, 5, and 6 disclose the circuit details of the arbitration logic of the port of FIG. 2.
Figure 5:
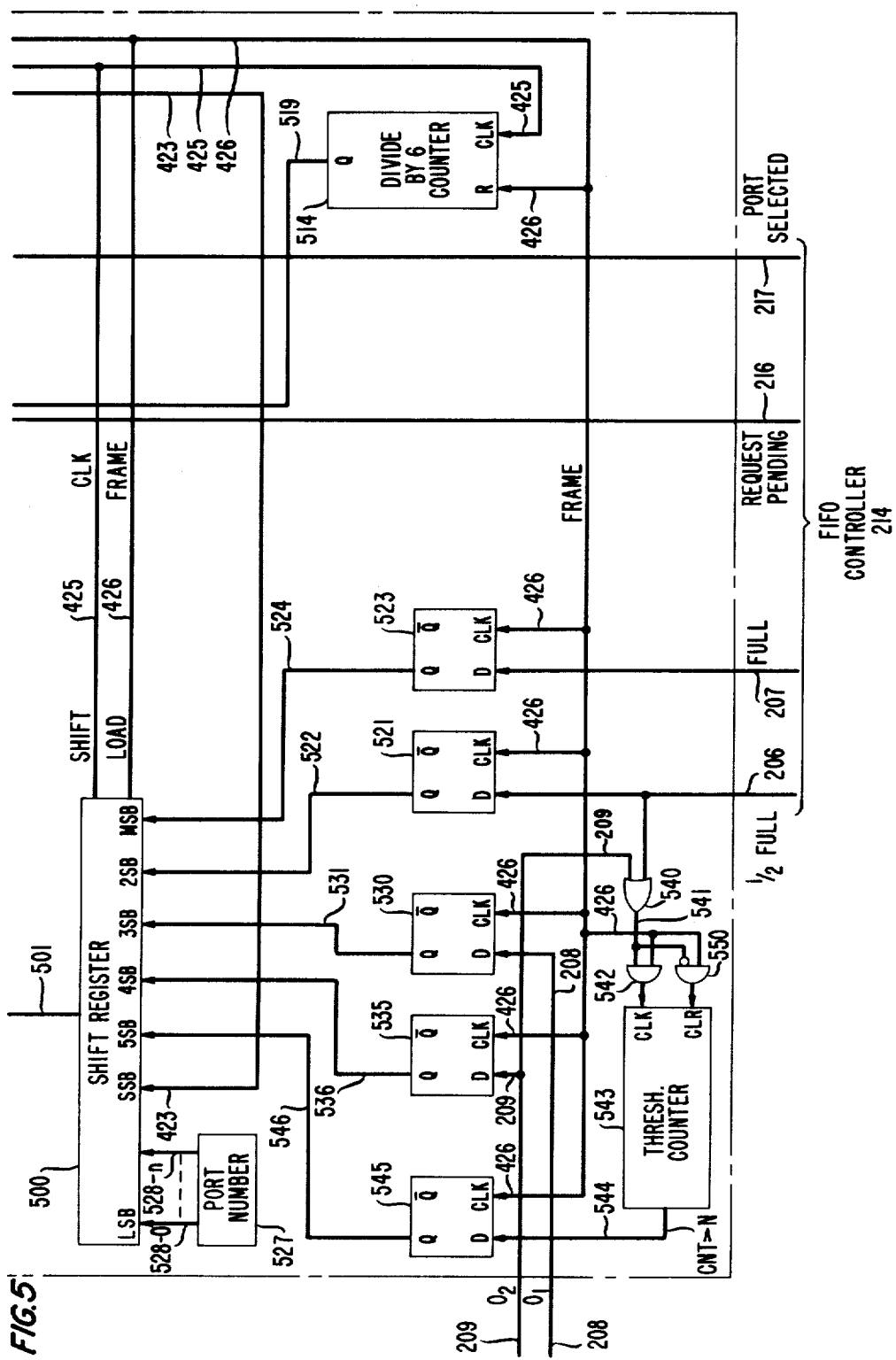
Figure 6:
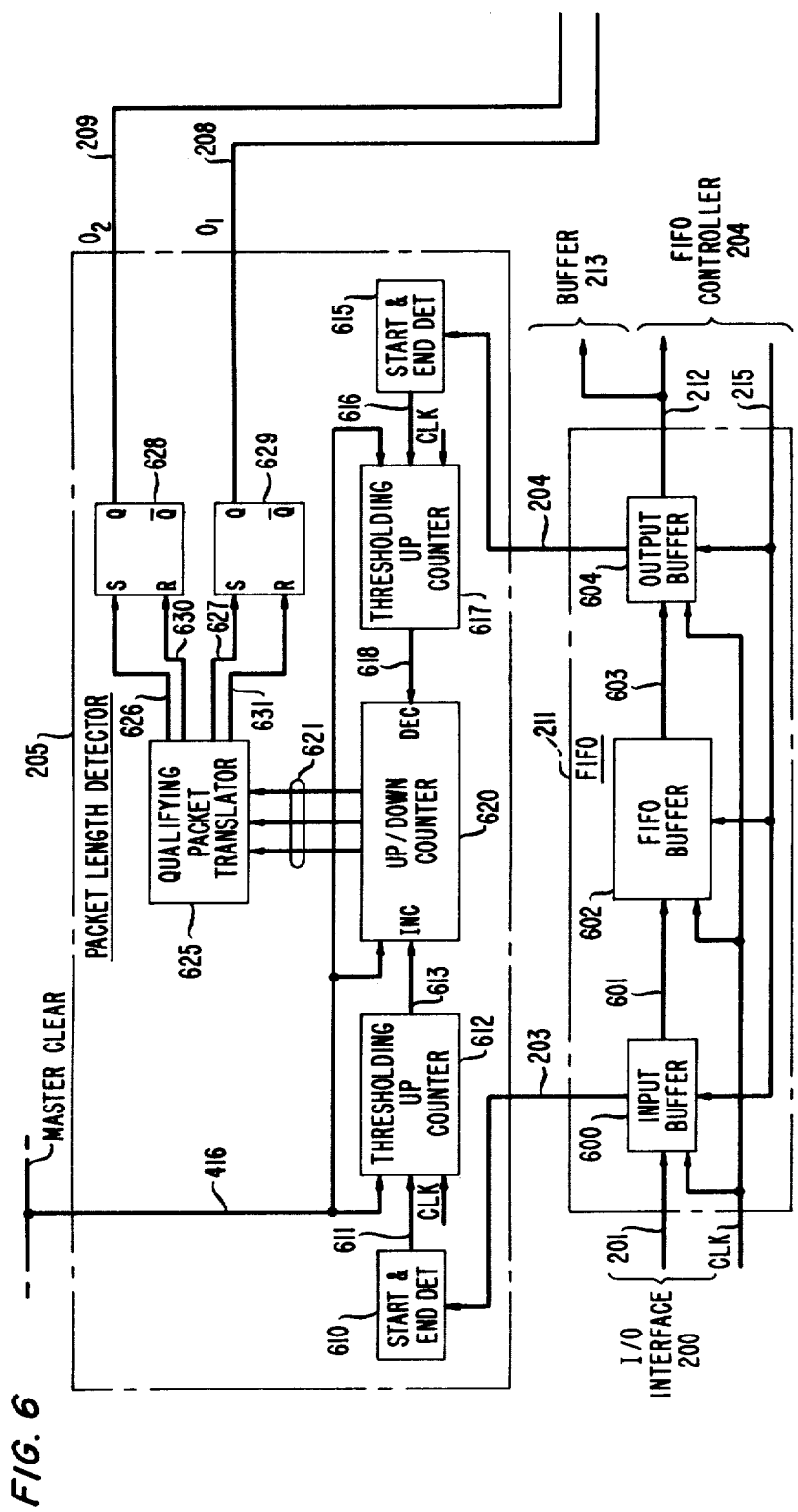

The details of the contention logic 218 of FIG. 2 are disclosed on FIGS. 4, 5, and 6 when arranged as shown on FIG. 7. Parallel-in, serial-out shift register 500 receives and stores the bits that are outpulsed to arbitration bus 102 during contention time. The shift register receives the assigned port priority number bits from element 527 which is hardwired to store these bits. The various port parameter bits are received by the shift register from the flip-flops and other circuitry shown immediately below the shift register on FIG. 5.

Path 524 applies a 1 as a FIFO buffer full signal to the most significant bit position of the shift register. Path 522 applies a 1 as an at least half-full signal to the second most significant bit position 2SB. Path 531 and 536 apply packet length information to the third and fourth most significant bit positions of the register. Path 546 applies a signal to the fifth most significant bit position (5SB) indicating that the port has waited at least a predetermined time for bus access after certain qualifying port events have occurred. Path 423 applies a signal representing a snapshot bit to the sixth most significant bit position.

The FIFO 211 as shown on FIG. 2 is shown in further detail on FIG. 6 and comprises an input buffer 600, FIFO buffer 602 and output buffer 604. The packet length detector 205 is also shown in further detail on FIG. 6. As subsequently described, this circuitry recognizes the receipt by buffer 600 and the outputting by buffer 604 of packets equal to or less than predetermined lengths and applies this information to up/down counter 620. The setting of the counter at any time specifies the number of packets of the predetermined length or less currently contained in buffer 602. The status of counter 620 is monitored by translator 625 to control the setting of flip-flops 628 and 629. Information representing the state of these flip-flops is applied over paths 208 and 209 to control flip-flops 530 and 535. The output of these flip-flops in turn applies corresponding port parameter information to the shift register.

Data packets received by a port from the device 120 it serves pass into input buffer 600 of FIFO 211 from I/O interface 200 on path 201. FIFO controller 214 sends a signal on path 215 to gate a data packet from input buffer 600 to FIFO buffer 602 on path 601, and from input buffer 600 to start-and-end detector 610 on path 203. Start-and-end detector 610 detects the packet boundaries by decoding the special packet envelope codes associated with each packet. The packet boundary data are passed to thresholding up-counter 612 on path 611. Thresholding upcounter 612 receives clock pulses and determines whether each packet is a short or long packet by counting the number of clock cycles contained within the packet boundaries determined by start-and-end detector 610, and by comparing that count with a predetermined packet length parameter. When thresholding up-counter 612 detects a packet of a predetermined length, such as a short packet, a pulse is passed over path 613 to up/down counter 620. This pulse increments up/down counter 620 which, in conjunction with counter 617, maintains a count of short packets in FIFO buffer 602. Up/down counter 620 passes the short packet count data over path 621 to qualifying packet-translator 625. Qualifying packet-translator 625 decodes the short packet count data to determine how many short packets are presently contained in FIFO buffer 602. If FIFO buffer 602 contains two or more short packets, for example, qualifying packet-translator 625 sends a positive pulse on path 626 to set SR flip-flop 628. If FIFO buffer 602 contains five or more short packets, qualifying packet-translator 625 sends a positive pulse on paths 626 and 627 to set SR flip-flops 628 and 629. These flip-flops, in turn, set flip-flops 530 and 535.

When the port is granted bus access, FIFO controller 214 sends a signal on path 215 to gate a data packet from FIFO buffer 602 to output buffer 604 on path 603 and to start-and-end detector 615 on path 204. Start-and-end detector 615 finds the packet boundaries by decoding the special packet envelope codes associated with each packet. The packet boundary data are passed to thresholding up-counter 617 on path 616. Thresholding upcounter 617 determines whether the packet is of a predetermined length, such as a short packet, by counting the number of clock cycles within the packet boundaries found by start-and-end detector 615 and by comparing that count with a predetermined packet length parameter. When thresholding up-counter 617 detects a short packet, for example, a pulse is passed over path 618 to up/down counter 620. This pulse decrements up/down counter 620 to maintain a count of short packets in FIFO buffer 602. Up/down counter 620 passes the short packet count data over path 621 to qualifying packet-translator 625, which as already discussed, decodes the short packet count data to determine how many short packets are currently stored in FIFO buffer 602. If FIFO buffer 602 contains less than two short packets, qualifying packet-translator 625 sends a positive pulse on path 630 to reset SR flip-flop 628. If FIFO buffer 602 contains less than five short packets, qualifying packet-translator 625 sends a positive pulse on path 631 to reset SR flip-flop 629.

The Q outputs of these SR flip-flops are passed to arbitration logic 218 on paths 208 and 209. A high at the Q output of SR flip-flop 629 indicates to arbitration logic 218 that there are at least five short packets stored in FIFO buffer 602. A high at the Q output of SR flip-flop 628 indicates to arbitration logic 218 that there are two or more short packets stored in FIFO buffer 602. If the Q outputs of SR flip-flops 628 and 629 are both low, then there are less than two short packets in FIFO buffer 602.

The information sent over path 212 to FIFO controller 214 includes occupancy information indicating whether buffer 602 is full, at least half-full or less than half-full. Signetics device 8X60, termed a FIFO RAM controller, provides information of this type.

Clock bus 103 passes the bit clock and FRAME CLOCK signals to port arbitration logic 218 on path 115-1. The bit clock signal is passed throughout port arbitration logic 218 on path 425, and the FRAME CLOCK is passed on path 426. The relationships between these two clocking signals are shown by the FIG. 3 timing diagrams.

When FIFO buffer 602 is full, the FULL signal goes high and is passed on path 207 from FIFO controller 214 to the D input of D flip-flop 523. The high transition of the next FRAME CLOCK on the CLK input of D flip-flop 523 sets the flip-flop and causes its Q output to go high. This Q output signal is passed to the MSB input of shift register 500 on path 524.

When FIFO buffer 602 is at least one-half full, the ½ FULL signal from FIFO controller 214 goes high and is passed on path 206 to the D input of D flip-flop 521 and to the lower input of OR gate 540. This high signal at the input of OR gate 540 causes its output to go high. The high output of OR gate 540 partially enables AND gate 542 via path 541. The high transition of the next FRAME CLOCK on the CLK input of D flip-flop 521 sets the flip-flop and causes its Q output to go high. The Q output of D flip-flop flop 521 is passed to the 2SB input of shift register 500 on path 522.

When more than five short packets are detected by packet length detector 205, a high signal is passed to the D input of D flip-flop 530 on path 208. At the next high transition of the FRAME CLOCK pulse on the CLK input of D flip-flop 530, the flip-flop is set to cause its Q output to go high. The Q output of D flip-flop 530 is fed to the 3SB input of shift register 500 on path 531. When at least two short packets are detected by packet length detector 205, a high signal is passed to the D input of D flip-flop 535 and OR gate 540 on path 209. This signal passes through gate 540 to one input of AND gate 542. At the next high transition of the FRAME CLOCK pulse on the CLK input of D flip-flop 535, the flip-flop is set and its Q output goes high. The Q output of D flip-flop 535 is fed to the 4SB input of shift register 500 on path 536.

The positive transition of the first FRAME CLOCK received after the output of OR gate 540 goes high enables AND gate 542 to apply a high signal to the CLK input of thresholding counter 543. Thresholding counter 543 counts each received frame pulse after either path 206 or 209 goes high. Thresholding counter 543 is advanced one count by the high output signal from AND gate 542. When the count reaches a preset threshold, its CNT>N output goes high. This output is fed to D input of D flip-flop 545 on line 544. D flip-flop 545 is then set by the high transition of the next FRAME CLOCK on its CLK input. This causes its Q output to go high. The Q output of flip-flop 545 is fed to the 5SB input of shift register 500 on path 546.

AND gate 550 receives one of its two inputs from gate 540 over path 541. The other input is the FRAME CLOCK over path 426. The function of gate 550 is to clear the threshold counter 543 over path 551 when the next frame pulse occurs after the output of gate 540 goes low. Gate 540 goes low when there is neither a high representing an at least half-full bit on path 206 nor a high short packet count bit on path 209. Since the input of gate 550 which receives the signal from gate 540 is inverted, a low signal on path 541 causes the frame pulse to be gated through gate 550 to threshold counter 543 which causes the counter to be cleared (its outputs goes low). When the output of threshold counter 543 goes low, this low is clocked into flip-flop 545 on the next frame pulse after the one which cleared the threshold counter 543. This will cause the SSB signal as applied to shift register 500 to go low. The threshold counter 543 and the flip-flop 545 both remain in the low output state until at least one of the two conditions permitting gate 540 to output a high signal occurs.

The following describes the circuitry of FIG. 4 that allows a port to set its snapshot bit to define a snapshot time whenever no other port is applying a 1 as a snapshot bit (SSB) to arbitration bus 102. When a port is first powered up, flip-flops 410, 412, 418, 421, and 422 are all reset by the MASTER CLEAR signal applied to their respective CLR inputs on path 416. When these flip-flops are in a reset state, their respective Q outputs are all low.

A high REQUEST PENDING signal is passed over path 216 from FIFO controller 214 to one input of NAND gate 430 and one input of AND gate 417 when the port requests bus access. The high transition of the next FRAME CLOCK is applied to the other input of NAND gate 430. This makes its output low. The low output from NAND gate 430 is passed to the Preset input of D flip-flop 410 and the Set input of SR flip-flop 412 on path 431. This sets the flip-flops and drives their Q outputs high. This enables the port to begin the application of the bits in shift register 500 to the arbitration bus 102.

Divide-by-6 counter 514 counts bit clock pulses that are passed to its CLK input on path 425 after each frame pulse is applied to its R input. After 5 bit clock pulses have been counted, divide-by-6 counter 514 passes the 6th bit clock pulse from its Q output to the CLK input of D flip-flop 418 on path 519. The bits applied to arbitration bus 102 by gate 406 are passed from bus 102 to the input of gate 417 on path 114-1. Since D flip-flop 418 is only clocked by the 6th bit clock pulse output from divide-by-6 counter 514, the Q output of the flip-flop is set high only if the output of AND gate 417 is high at this time. The output of AND gate 417 is high at bit clock 6 time only if there are no 1's (wired OR lows) currently applied as a snapshot bit to arbitration bus 102 by bidding port circuits. The Q output of set flip-flop 418 is passed to the Set input of SR flip-flop 422 on path 419 to set its Q output high. This high output is passed to the SSB input of shift register 500 on path 423. The snapshot bit is then loaded into shift register 500 by the low transition of the next FRAME CLOCK.

In order for the rising edge of the pulse generated by the divide-by-6 counter 514 to correctly clock the snapshot bit into flip-flop 418, care must be taken for the particular combination of parts selected that the snapshot signal will still be stable at the D input of flip-flop 418 when the clock pulse comes from counter 514. A potential race condition exists here because the same rising edge of the bit clock which causes the arbitration logic to put the SSB bit out on arbitration bus 102 also clocks counter 514. For most implementations, a worst case timing analysis would show that the delay caused by the combination of the delays caused by shift register 500, gate 404, bus driver gate 406, the capacitance of arbitration bus 102, and gate 417 is much greater than the delay through counter 514 and hence no race condition would exist. If, for a particular choice of logic parts, a race problem exists, then a delay element can be inserted between gate 417 and the D input of flip-flop 418 to eliminate the problem.

Gate 409 detects mismatches between the bit each port applies to the bus and the logical union of the bit value of the bus as each bit is applied. A mismatch is detected when a port applies an 0 to the bus 102 at a time when a 1 is applied by another port.

A port wins access to packet bus 105 when a mismatch condition is not detected by exclusive-OR gate 409 as the contents of shift register 500 are read out and applied to bus 102. The Q outputs of flip-flops 410 and 412 remain high at this time and the high Q output from SR flip-flop 412 is passed to the D input of D flip-flop 421 on path 413. The high transition of the next FRAME CLOCK pulse sets the Q output of D flip-flop 421 high. The Q output from D flip-flop 421 is passed as a PORT SELECTED signal on path 217. The PORT SELECTED signal is passed to the Reset input of SR flip-flop 422, to set its Q output low. This Q output from SR flip-flop 422 is passed as an 0 to the SSB input of shift register 500. The FRAME CLOCK is passed to the LOAD input of shift register 500 on path 426. When the FRAME CLOCK goes low, the various bits that appear on shift register 500 input lines are loaded into shift register in parallel. These bits represent the Q outputs of flip-flops 523, 521, 530, 535, 545 the snapshot bit, on path 423, and the assigned port number from hardwired port number element 527. The bits are then serially shifted out of shift register 500 by the bit clock that is applied to the SHIFT input of the shift register on path 425. One bit is shifted out of shift register 500 with each positive transition of the bit clock. The MSB is shifted out first, followed by the bits 2SB, 3SB, ... LSB, in that order, from shift register 500 to exclusive-OR gate 404 on path 501. The bits readout of shift register 500 are operated on by exclusive-OR gate 404 and passed to 3-input NAND gate 406 as explained next.

Divide-by-6 counter 433 and SR flip-flop 435 allow a low signal on the mask bus 104 to mask selectively only the port-occupancy bits, packet-length bits, the bit from counter 543, and snapshot bits (bits MSB ... SSB), so that bus access can then be controlled by any of these bits which are not masked and the bits from element 527. Counter 433 prevents any of the port number bits from element 527 from being masked so that the assigned port number is always available during an arbitration cycle. Counter 433 also allows a high signal on the polarity bus 101 to invert only the assigned port-number bits read out of shift register 500 to arbitration bus 102. This prevents bits MSB ... SSB from being inverted.

Divide-by-6 counter 433 and SR flip-flop 435 are reset when the FRAME CLOCK applied to their Reset inputs as path 426 goes high and causes their Q outputs to go low. As bits MSB ... SSB are read out of shift register 500, the low Q output of SR flip-flop 435 is passed to NOR gate 437. This partially enables gate 437 so that it can invert a low signal received from mask bus 104 on path 118-1. A received low mask bus signal is then passed as a high from NOR gate 437 to OR gate 440 on path 438. This high prevents flip-flop 410 from being reset during the reception of the parameter bits (MSB ... SSB) as later described. A high mask bus signal is inverted and passed as a low from NOR gate 437 to OR gate 440 on path 438. This low allows flip-flop 410 to be reset on a mismatch detected by gate 409. This allows any combination of parameter bits to be ignored in the contention cycle, but they are still placed on arbitration bus 102 so that a facility for gathering network statistics (such as how often at least one port is full) need only monitor arbitration bus 102.

The low Q output of SR flip-flop 435 is also passed to one input of AND gate 402 on path 436. This low signal disables AND gate 402 and forces its output low. This prevents the polarity bus 101 from inverting the parameter bits. The low output from AND gate 402 is passed to one input of exclusive-OR gate 404 on path 403. The parameter bits readout of shift register 500 are passed to the other input of exclusive-OR gate 404 on path 501. If the bit from register 500 is high, the output from exclusive-OR 404 is high and, if the bit from shift register 500 is low, the output from exclusive-OR 404 is low. Thus, with the upper input of exclusive-OR gate 404 held low, the bits input from shift register 500 are not inverted and are passed by exclusive-OR gate 404 to the center input of 3-input NAND gate 406 and to the lower input of exclusive-OR gate 409 on path 405.

As each parameter bit is readout of shift register 500 by the bit clock, the bit clock also increments divide-by-6 counter 433. After 5 bit clock pulses have been counted, the first five bits (MSB . . . 5SB) have been shifted out of shift register 500, divide-by-6 counter sets its output high when the next CLK pulse is received corresponding to the SSB bit. This high signal is passed to the S input of SR flip-flop 435 on path 434 to set the Q output of the flip-flop high. The Q output from SR flip-flop 435 is passed to NOR gate 437 and AND gate 402. The high input on NOR gate 437 forces its output low. The low output from NOR gate 437 is passed to OR gate 440 on path 438. This prevents a low mask bus signal from being effective to mask the assigned port priority bits since a low on the input of gate 437 cannot drive the output of the gate high. The high signal from SR flip-flop 435 to AND gate 402 partially enables the AND gate. This permits a polarity reversal signal (a high) to be passed from polarity bus 101 through AND gate 402 to exclusive-OR gate 404.

The polarity reversal signal from polarity bus 101 on path 113-1 is used to invert selectively the assigned port-number bits that are read out of the port to arbitration bus 102 on path 114-1. A low polarity signal passes the port-number bit to arbitration bus 102 uninverted; a high polarity signal passes an inverted port-number bit to arbitration bus 102. The port-number bits are selectively controlled by the polarity signal applied to exclusive-OR gate 404 on path 113-1 as explained next.

If the polarity signal and the port-number bit presented to exclusive-OR gate 404 are both high or both low, the output from exclusive-OR 404 is low. If the polarity signal and the port-number bit presented to exclusive-OR gate 404 are different (one high and one low) the output from exclusive-OR gate 404 is a high. In other words, a low polarity signal causes an assigned port-number bit to be passed unchanged by exclusive-OR 404, a high polarity signal causes an inverted port-number bit to be passed by exclusive-OR 404. These bits at the output of exclusive-OR gate 404 are inverted by enabled 3-input NAND gate 406 and applied to the arbitration bus 102. The bits from exclusive-OR gate 404 are also passed to exclusive-OR gate 409.

The left and right inputs of 3-input NAND gate 406 are enabled as now described. The D input to D flip-flop 442 is high when the controller passes a high PORT ENABLE signal over path 119-1. The high transition of the next FRAME clock sets the flip-flop, causing its Q output to go high. The Q output from D flip-flop 442 is passed to the left input of AND gate 406 on path 443. D flip-flop 442 remains set (holding its Q output high) unless a low PORT DISABLE signal is passed from the controller to the D input of the flip-flop to disable this port and prevent it from bidding for bus access.

When this port requests bus access, FIFO controller 214 sets the REQUEST PENDING signal 216 high. This REQUEST PENDING signal is passed to the lower input of AND gate 417 and the right input of NAND gate 430 on path 216. This enables both of these gates. When the next FRAME CLOCK goes high, the output of NAND gate 430 goes low. The low output of NAND gate 430 is passed to the Low-Preset input of D flip-flop 410, and to the Low-Set input of SR flip-flop 412 on path 431. This low input sets both of the flip-flops to cause their Q outputs to go high. The Q output from SR flip-flop 412 is passed to the right input of NAND gate 406 and to the D input of D flip-flop 421 on path 413.

The bits passed by gate 404 to the middle input of enabled 3-input NAND gate 406 on path 405 are inverted by the NAND gate and passed as priority bits to arbitration bus 102 on path 407.

When the priority bits are passed from exclusive-OR gate 404 to 3-input NAND gate 406, they are also passed to exclusive-OR gate 409 on path 405. The logical union of priority bits that are placed on arbitration bus 102 by requesting all ports (including this one) are applied from arbitration bus 102 to exclusive OR gate 409. Since any priority bits applied from this port to the arbitration bus are inverted by 3-input NAND gate 406, the inputs to exclusive-OR gate 409 will not match if the digit value of the Priority bit from arbitration bus 102 is the same as the priority bit output from 3-input NAND gate 406 to arbitration bus 102. If the inputs to exclusive-OR gate 409 do not match, the output of exclusive-OR gate 409 remains high. This high output is passed on path 439 to OR gate 440 to cause its output to go high. The high output from OR gate 440 is passed to the D input of D flip-flop 410. The high input on D flip-flop 410 allows its Q output to remain high. This Q output is passed from D flip-flop 410 to the Low-Reset input of SR flip-flop 412 on path 411. The high on the Low-Reset input of SR flip-flop 412 does not reset the flip-flop, and its Q output remains high. The high Q output from SR flip-flop 412 is passed to 3-input NAND gate 406. This allows the NAND gate to continue to pass subsequent priority bits to arbitration bus 102.

The only way the inputs of exclusive-OR gate 409 can match is when an "0" bit is applied by the port to the bus and a "1" bit is already on the bus (indicating that another port has higher priority), or when a "1" bit is output to the bus and a "0" is returned (indicating a defective 3-input NAND gate). In either case, the port removes itself from contention if a low mask bus signal is not present on bus 104.

The mask bus signal is allowed to have an effect only during the first 6 bit times (MSB . . . SSB). The output of NOR gate 437 is held low at all other times by the high Q output of SR flip-flop 435. A low signal from mask bus 104 during the time of the first six bits forces the output of NOR gate 437 high. The high output from NOR gate 437 is passed to OR gate 440 on path 438, forcing its output high and preventing a low from the output of exclusive-OR gate 409 from being passed as the gate detects a mismatch. If a high signal is received from mask bus 104 by NOR gate 437, the output of NOR gate 437 goes low. This allows OR gate 440 to pass bits from exclusive-OR gate 409.

After the first five bits (MSB . . . SSB) have been passed to the arbitration bus, SR flip-flop 435 is set by the sixth CLK pulse. This causes its Q output to go high. This Q signal is passed to NOR gate 437 to force its output low. This prevents a mask bus signal from being passed to OR gate 440 on path 438. If the inputs to exclusive-OR gate 409 match, the output of the gate goes low. This output is passed to OR gate 440 on path 439. The low input on OR gate 440 forces its output low (since its other input is held by NOR gate 437). The low output from OR gate 440 is passed to the D input of D flip-flop 410. When the next bit clock at the CLK input of D flip-flop 410 goes high, its Q output is set low. The Q output from D flip-flop 410 is passed to the Low-Reset input of SR flip-flop 412 on path 411 to drive its Q output low. The Q output from SR flip-flop 412 is passed to the D input of D flip-flop 421 and to one input of 3-input NAND gate 406. The low at the input of gate 406 disables the gate and removes the port from contention.

This port will not send any more bits to arbitration bus 102 until the next FRAME CLOCK goes high and the REQUEST PENDING signal from FIFO controller 214 is high.

What is claimed is:

1. In a system for allocating access to a demand-shared facility among a plurality of units wherein each unit has an assigned unique n digit priority number for determining facility access during concurrent requests by said units, said system comprising;

an arbitration bus interconnecting all of said units, a plurality of multistate logic devices in each of said units, means in each of said units for requesting access to said facility, control means in each of said units for selectively and combinationally switching from a first to a second state said logic devices under control of specified parameters representing the current dynamic state of said units, a buffer memory in each unit for receiving messages of different lengths, said control means further comprising;

means in each unit for determining the number of messages of a specified criterion currently stored in the buffer memory of said unit, means for switching from a first to a second state at least a first one of said logic devices of a unit to indicate the presence of at least a predetermined number of messages of said specified criterion in the buffer memory of said unit, means for forming a dynamic priority number for each of said units by applying the outputs of said logic devices of each unit as parameter digits to the more significant digit positions of said dynamic number and by applying the digits of the assigned priority number of each unit to the lesser significant digit positions of said dynamic number, means in each of said units currently requesting access to said demand-shared facility for concurrently superimposing the corresponding digits of the associated dynamic priority number onto said arbitration bus sequentially digit by digit, means for comparing the digit values on said bus with the corresponding digit values applied by each of said requesting units, and means for removing from facility access contention a requesting one of said units upon the detection of a prescribed comparison result between a bus digit value and the corresponding digit value of said unit.

2. The system of claim 1 in combination with;

a mask bus interconnecting said units, means for applying a mask signal at selected times to said mask bus, and means in each unit responsive when said mask signal is extant on said mask bus for disabling said comparing means so that said parameter bits concurrently on said bus are not used in determining unit access, said last named means being effective so that preference between requesting units is determined by any of said parameter bits whose comparison is not disabled and by the bits of said assigned priority numbers.

3. The system of claim 1 or 2 wherein said determining means of each unit comprises;

a counter, means for incrementing said counter whenever said memory of said unit receives a message having said predetermined criterion, means for decrementing said counter whenever a message having said criterion is read out of said memory as said unit is granted facility access, a translator connected to said counter for determining a predetermined count within said counter, and means connecting an output of said translator with said first logic device for switching said device from a first to a second state whenever said memory contains at least a predetermined number of messages meeting said criterion.

4. The system of claim 3 wherein said control means further comprises;

means in each unit for measuring the time elapsed within each unit following a predetermined event within each unit, and means for switching a second one of said logic devices from a first to a second state to generate a parameter bit indicating that at least a specified time has elapsed within a unit.

5. The system of claim 1 in combination with;

means for monitoring the buffer memory in each unit to determine whether it is less than X percent full or X percent full or full of information to be applied by said unit to said facility, means for switching from a first to second state a third one of said logic devices in each unit when said buffer memory is at least X percent full, means for switching from a first to a second state a fourth one of said logic devices of a unit when said unit's buffer memory is full, and means for applying outputs of said logic devices as parameter bits and as the more significant bits of said dynamic priority number.

6. The system of claim 5 in combination with;

means in each unit and controlled by said controller for defining a snapshot time occurrence, means in each unit for recording a facility access request extant during a snapshot time occurrence, said last name means including means for switching a fifth one of said logic devices from a first to a second state in each unit having a service request extant during a snapshot time occurrence, and means in each unit having said fifth logic device in a second state for generating a snapshot digit as one of said parameter digits of said unit's dynamic priority number.

7. In a system for allocating access to a demand-shared data bus among a plurality of ports wherein each port has an assigned unique n digit priority number for determining data bus access during concurrent requests by said ports, said system comprising;
   an arbitration bus interconnecting all of said ports,
   a plurality of flip-flops in each of said ports,
   means in each of said ports for requesting access to said data bus,
   control means in each of said ports for selectively and combinationally setting said flip-flops under control of specified parameters representing the current dynamic state of said ports,
   a buffer memory in each port for receiving messages of different lengths,
   said control means further comprising;
   means for determining the number of messages having a specified length criterion currently stored in each of said buffer memories,
   means for setting at least a first one of said flip-flops to indicate the presence of at least a predetermined number of messages of said specified length criterion in the buffer memory of a port,
   said system further comprising;
   means for forming a dynamic priority number for each of said ports by applying the outputs of said logic devices as parameter bits to the more significant bit positions of said dynamic number and by applying the bits of said assigned priority number to the lesser significant digit positions of said dynamic number,
   means in each of said ports currently requesting access to said data bus for concurrently superimposing the corresponding bits of the associated dynamic priority number onto said arbitration bus sequentially digit by digit,
   means for comparing the digit values on said bus with the corresponding digit values applied by each of said requesting ports,
   a mask bus interconnecting said units,
   means for applying a mask signal at selected times to said mask bus,
   means in each port responsive when said mask signal is extant on said mask bus for disabling said comparing means so that said parameter bits concurrently on said bus are not used in determining unit access, and
   means for removing from data bus access contention a requesting one of said ports upon the detection of a prescribed comparison result between an arbitration bus digit value and the corresponding digit value of said one port,
   said first named means being effective so that preference between requesting ports is determined by any of said parameter bits whose comparison is not disabled and by the bits of said assigned priority numbers.

8. The system of claim 7 wherein said determining means comprises;
   a counter,
   means for detecting the receipt by said memory of a message having said specified length criterion,
   means controlled by said detector for incrementing said counter whenever said memory receives a message having said predetermined length criterion,
   means for detecting the readout from said memory of a message having said specified length criterion,
   means controlled by said last named detector for decrementing said counter whenever a message having said criterion is readout of said memory as said port is granted facility access,
   a translator connected to said counter for identifying a predetermined count within said counter, and
   means connecting an output of said translator with at least said first one of said flip-flops for switching said flip-flop from a first to a second state whenever said memory contains at least a predetermined number of messages meeting said criterion.

9. The system of claim 7 or 8 wherein said control means further comprises;
   means in each port for measuring the time elapsed within each port following a predetermined port event, and
   means for switching a second one of said flip-flops from a first to a second state to indicate that at least a specified time has elapsed within a port following the occurrence of said port event.

10. The system of claim 9 in combination with;
    means for monitoring the buffer memory in each port to determine whether it is less than X percent full or X percent full or full of information to be applied by said port to said data bus,
    means for switching from a first to a second state a third one of said logic devices in each port when said buffer memory of said port is at least X percent full,
    means for switching from a first to a second state a fourth one of said logic devices of a port when said port's buffer memory is full, and
    means for applying outputs of said set logic devices as port parameter bits and as the more significant bits of said ports dynamic priority number.

11. The system of claim 10 in combination with;
    means in each port and controlled by said controller for defining a snapshot time occurrence,
    means in each port for recording a data bus access request extant during a snapshot time occurrence, and
    said last named means including means for setting a fifth one of said logic devices from a first to a second state in each unit having a service request extant during a snapshot time occurrence,
    means in each port having said fifth logic device in a second state for generating a snapshot digit as one of said parameter digits of said ports dynamic priority number.

12. A method of allocating access to a demand-shared data bus among a plurality of ports wherein each port has an assigned unique n digit priority number for determining data bus access during concurrent requests by said ports, said method comprising the steps of;
    (1) selectively and combinationally setting flip-flops in each port under control of specified parameters representing the current dynamic state of each of said ports,
    (2) determining the number of messages of a specified criterion currently stored in a buffer memory of each port,
    (3) setting at least a first one of said flip-flops in each port to indicate the presence of a predetermined number of messages of said specified criterion in the buffer memory of said port, (4) forming a dynamic priority number for each of said ports by applying the outputs of said flip-flops in each port as port parameter bits to the more significant bit positions of a shift register in each port and by applying the bits of each port's assigned priority number to the lesser significant bit positions of said port's shift register, (5) reading out sequentially the bits in the shift register of each port, (6) applying to the first gate means in each port said digits readout from the shift register of said port sequentially digit by digit in order of most significant digit to least significant digit, (7) enabling said first gate means of each requesting port so that said dynamic priority number digits readout of said shift register are applied sequentially to said arbitration bus in synchronism with the application of corresponding digits to said arbitration bus by other of said ports currently requesting access to said data bus, (8) comparing each digit value applied to said arbitration bus by each requesting said port with the digit value then on said bus from other requesting ports, and (9) deactivating said first gate of a requesting port whenever any digit value on said arbitration bus has a higher priority than the corresponding digit applied to said arbitration bus by said requesting port,

(10) said preference for data bus access between said requesting ports being determined by any parameter bits and by the applied bits of said assigned priority numbers of said requesting ports.

13. The method of claim 12 in combination with the steps of;

(1) applying a mask signal at selected times to a mask bus connected to all ports, and (2) preventing said first gate of each requesting port from being deactivated whenever a mask signal is extant on said mask bus during the application of said parameter bits to said arbitration bus, (3) said preference for data bus access being determined by any parameter bits applied to said arbitration bus when a mask signal is not extant on said mask bus and by the applied bits of said assigned priority numbers of said requesting ports.

14. The method of claim 13 in combination with the additional step of;

(1) permitting the deactivating of said first gate in the event a mask signal is extant on said mask bus when the assigned priority number digits of a requesting port are applied to said arbitration bus.

15. The method of claim 12 or 14 wherein the steps of determining the number of messages comprises the steps of;

(1) incrementing a counter upon each receipt by said port buffer memory of a message having said predetermined criterion, (2) decrementing said counter whenever a message having said criterion is readout of said memory when said port is granted data bus access, (3) translating the count of said counter to provide an indication whenever said memory currently contains at least a predetermined number of messages meeting said criterion, and (4) setting at least said first one of said flip-flops under control of said translator whenever said memory contains at least said predetermined number of messages meeting said criterion.

16. The method of claim 15 in combination with the additional steps of;

(1) counting the time elapsed within each requesting port following a specified port event, (2) generating an output signal when a predetermined time has elapsed, and (3) setting a second one of said parameter flip-flops under control of said signal.

17. The method of claim 16 in combination with the additional steps of;

(1) monitoring the buffer memory in each port to determine whether it is less than X percent full or X percent full or full of information to be applied by said port to said data bus, (2) switching from a first to second state a third one of said flip-flops in each port when said buffer is at least X percent full, (3) switching from a first to a second state a fourth one of said flip-flops of a port when said port's buffer is full, and (4) applying outputs of said third and fourth flipsflops as parameter bits to said shift register as the more significant bits of said dynamic priority number.

18. The method of claim 17 in combination with the additional steps of;

(1) defining a snapshot time occurrence, (2) recording a data bus access request extant in each port during a snapshot time occurrence, and (3) setting a fifth one of said flip-flops from a first to a second state in each port having a service request extant during a snapshot bit as one of said parameter bits of said port's dynamic priority number in each port having said fifth flip-flop in a second state.

* * * * *